United States Patent
Kolhatkar et al.

(10) Patent No.: US 9,214,874 B2
(45) Date of Patent: Dec. 15, 2015

(54) INTELLIGENT LEVEL TRANSITION SYSTEMS AND METHODS FOR TRANSFORMERLESS UNINTERRUPTIBLE POWER SUPPLY

(76) Inventors: Yashomani Y. Kolhatkar, Secunderabad (IN); Silvio Colombi, Losone (CH); Marco Piemontesi, Ticino (CH); Lauro Strozzi, Gordola (CH); M N Lakshmi Prasad, Secunderabad (IN)

(*) Notice: Subject to any disclaimer, the term of this patent is extended or adjusted under 35 U.S.C. 154(b) by 421 days.

(21) Appl. No.: 13/563,481

(22) Filed: Jul. 31, 2012

(65) Prior Publication Data

US 2014/0036555 A1 Feb. 6, 2014

(51) Int. Cl.
*H02H 7/122* (2006.01)
*H02M 7/487* (2007.01)
*H02M 7/5387* (2007.01)
*H02J 9/06* (2006.01)

(52) U.S. Cl.
CPC .............. *H02M 7/487* (2013.01); *H02J 9/062* (2013.01); *H02M 7/5387* (2013.01)

(58) Field of Classification Search
USPC ............. 363/34, 37, 40, 41, 55, 56.01, 56.02, 363/95, 98, 131, 132
See application file for complete search history.

(56) References Cited

U.S. PATENT DOCUMENTS

| | | | |
|---|---|---|---|
| 6,842,354 B1* | 1/2005 | Tallam et al. | 363/98 |
| 7,679,217 B2 | 3/2010 | Dishman et al. | |
| 7,706,163 B2* | 4/2010 | Tan et al. | 363/132 |
| 2006/0245216 A1* | 11/2006 | Wu et al. | 363/13 |
| 2011/0116293 A1* | 5/2011 | Tabata et al. | 363/132 |
| 2011/0141786 A1* | 6/2011 | Shen et al. | 363/131 |

OTHER PUBLICATIONS

P. Satish Kumar et al.; An Effective Space-Vector PWM Method for Multi-level Inverter Based on Two-level Inverter; IACSIT; pp. 243-250.

Nashiren F. Mailah et al.; Neutral-Point-Clamped Multilevel Inverter Using Space Vector Modulation; European Journal of Scientific Research; ISSN 1450-216X vol. 28, No. 1 (2009), pp. 82-91; © EuroJournals Publishing, Inc. 2009; http://www.eurojournals.com/ejsr.htm.

* cited by examiner

*Primary Examiner* — Nguyen Tran
(74) *Attorney, Agent, or Firm* — Fletcher Yoder, P.C.

(57) ABSTRACT

Systems and methods are provided for controlling an uninterruptible power supply (UPS) to transition between three- or higher-level operation and two-level operation in a neutral-point-clamped (NPC) inverter. In an example, a UPS system includes an NPC inverter and a controller. The NPC inverter may supply power to a load. The controller may control the inverter to operate in a three-level mode or higher when the load is substantially balanced and to operate in a two-level mode when the load is substantially unbalanced.

19 Claims, 10 Drawing Sheets

INTELLIGENT LEVEL TRANSITION SYSTEMS AND METHODS FOR TRANSFORMERLESS UNINTERRUPTIBLE POWER SUPPLY

BACKGROUND OF THE INVENTION

The present disclosure relates to controlling a transformerless uninterruptible power supply (UPS) system.

An uninterruptible power supply (UPS) is an electrical device that can supply power to a load despite variations in quality and/or availability of utility-based power. Some transformerless UPS systems may employ a neutral-point-clamped (NPC) inverter, flying capacitor inverter, and/or cascaded H-bridge inverter. Some of these converters, such as the NPC inverter, may be quite efficient, but could become unstable when a steady-state imbalance in the neutral-point voltage arises. As a result of a neutral-point imbalance, output voltages could become distorted with a DC offset in the output voltage and/or current. Such output DC offsets could, in turn, cause devices to fail due to higher stress, saturate filter inductors, and/or deteriorate the output power quality. Although various strategies have been introduced to solve this problem, these solutions may be costly and/or highly complex. Many of the existing solutions are based on adding a zero-sequence voltage component to the output voltage and/or by manipulating the redundant switching vectors when applying vector control. Some of these techniques may also address the so-called short-pulse problem. Most of these methods, however, have disadvantages in terms of the maximum usable modulation index. Additionally, these methods may produce an increase in the switching losses of the NPC inverter and may require extremely complex control algorithms.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an uninterruptible power supply (UPS) system includes a neutral-point-clamped (NPC) inverter and a controller. The NPC inverter may supply power to a load. The controller may control the inverter to operate in a three-level mode or higher when the load is substantially balanced and to operate in a two-level mode when the load is substantially unbalanced.

In a second embodiment, an article of manufacture includes one or more tangible, machine-readable media at least collectively comprising machine-executable instructions. The instructions may include instructions to receive a value of a first voltage difference associated with a first capacitor in a neutral-point-clamped inverter, instructions to receive a value of a second voltage difference associated with a second capacitor in the neutral-point-clamped inverter, and instructions to determine a value of a difference between the first voltage difference and the second voltage difference. The instructions may determine, when the difference between the first voltage difference and the second voltage difference does not exceed a threshold, to operate the neutral-point-clamped inverter according to a three-level mode or higher. The instructions may also determine, when the difference between the first voltage difference and the second voltage difference exceeds the threshold, to operate the neutral-point-clamped inverter according to a two-level mode.

In a third embodiment, a method includes determining, in a controller, a modulating signal to control a four-wire neutral-point-clamped inverter according to a three-level mode. When the modulating signal is greater than 0, the modulating signal may be multiplied by a first input value to obtain an output value. When the modulating signal is not greater than 0, the modulating signal may be multiplied by negative one and a second input value to obtain the output value. The method may also include comparing, in the controller, the output value to a triangular waveform to determine control signals to control the neutral-point-clamped inverter to mitigate ground current.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to controlling an uninterruptible power supply (UPS) that employs a neutral-point-clamped (NPC) inverter. In particular, the present disclosure relates to an NPC inverter that can be operated in either a three- or higher-level mode or a two-level mode depending on the extent of load imbalances. Three- or higher-level operation may provide certain advantages over two-level operation, such a low harmonic distortion of alternating current (AC) currents, relatively lower switching losses, and less blocking voltage of the switching devices in the NPC inverter. On the other hand, three-level operation could result in imbalances in the DC voltage level in the NPC inverter when the load is unbalanced. Under two-level operation, the NPC inverter may operate properly even with a highly unbalanced load. Accordingly, the present disclosure teaches an uninterruptible power supply (UPS) that controls an NPC inverter to operate in a three-level mode when a load is substantially balanced (i.e., completely balanced or only moderately unbalanced—that is, not unbalanced beyond the extent that certain corrective measures taken in a three-level mode could mitigate such a moderate unbalanced load). The UPS may control the NPC inverter to operate in a two-level mode when the load is substantially unbalanced (i.e., more than moderately unbalanced—that is, so unbalanced that corrective measures taken in a three-level mode would not mitigate the effects of the unbalanced loading).

Figure 1:
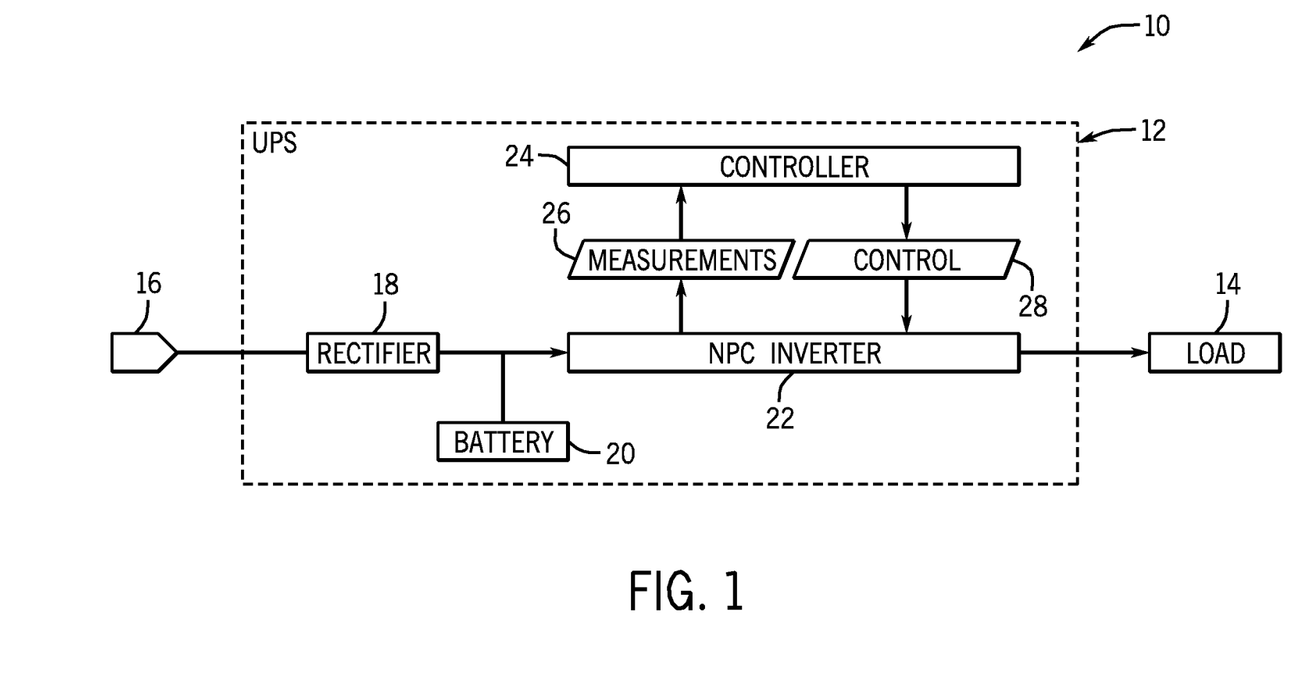
FIG. 1 is a block diagram of a transformerless uninterruptible power supply (UPS) employing an intelligent level transition control topology, in accordance with an embodiment.

One example of such an uninterruptible power supply (UPS) system 10 appears in FIG. 1. The UPS system 10 includes an uninterruptible power supply (UPS) 12 that feeds a load 14. A power source 16 supplies the UPS 12 with alternating current (AC) power. The power source 16 may represent, for example, utility power from an electrical grid or a local or remote generator. A rectifier 18 may convert the AC power into direct current (DC) power. Some of this DC power may be stored in a battery 20 or other suitable energy storage device. A neutral-point-clamped (NPC) inverter 22 may convert the DC power from the rectifier 18 and/or the battery 20 into three-phase AC power supplied to the load 14.

The NPC inverter 22 may operate in a three-level mode under substantially balanced (i.e., completely balanced or only moderately unbalanced—that is, not unbalanced beyond the extent that certain corrective measures taken in a three-level mode could mitigate such a moderate unbalanced load) conditions. Under substantially unbalanced (i.e., more than moderately unbalanced—that is, so unbalanced that corrective measures taken in a three-level mode would not mitigate the effects of the unbalanced loading) conditions, the NPC inverter 22 may operate in a two-level mode to provide sufficient balance. It should be appreciated that operating in the three-level mode is generally preferred, as the quality of the AC waveform supplied to the load 14 may be somewhat better than that supplied in the two-level mode. Although the NPC inverter 22 is described as operating in either a two-level or three-level mode, it should be understood that, in other embodiments, the NPC inverter 22 may operate in a higher mode than three-level. In any case, the NPC inverter 22 may operate in a two-level under substantially unbalanced conditions.

A controller 24 may receive various electrical measurements 26 from various locations in the UPS 12 and issue control signals 28 to control the NPC inverter 22 in the two-level or three-level modes. To determine the control signals 28, the UPS controller 24 may employ a processor operably coupled to memory and/or storage. The processor and/or other data processing circuitry may carry out instructions stored on any suitable article of manufacture having one or more tangible, machine-readable media at least collectively storing such instructions. The memory and/or storage may represent such articles of manufacture. Among other things, the memory and/or the storage may represent random-access memory, read-only memory, rewriteable memory, a hard drive, or optical discs. Additionally or alternatively, the UPS controller 24 may include a field programmable gate array (FPGA) or an application-specific integrated circuit (ASIC) that has been programmed to carry out the techniques discussed herein or to support the processor (e.g., by assisting in communication).

Figure 2:
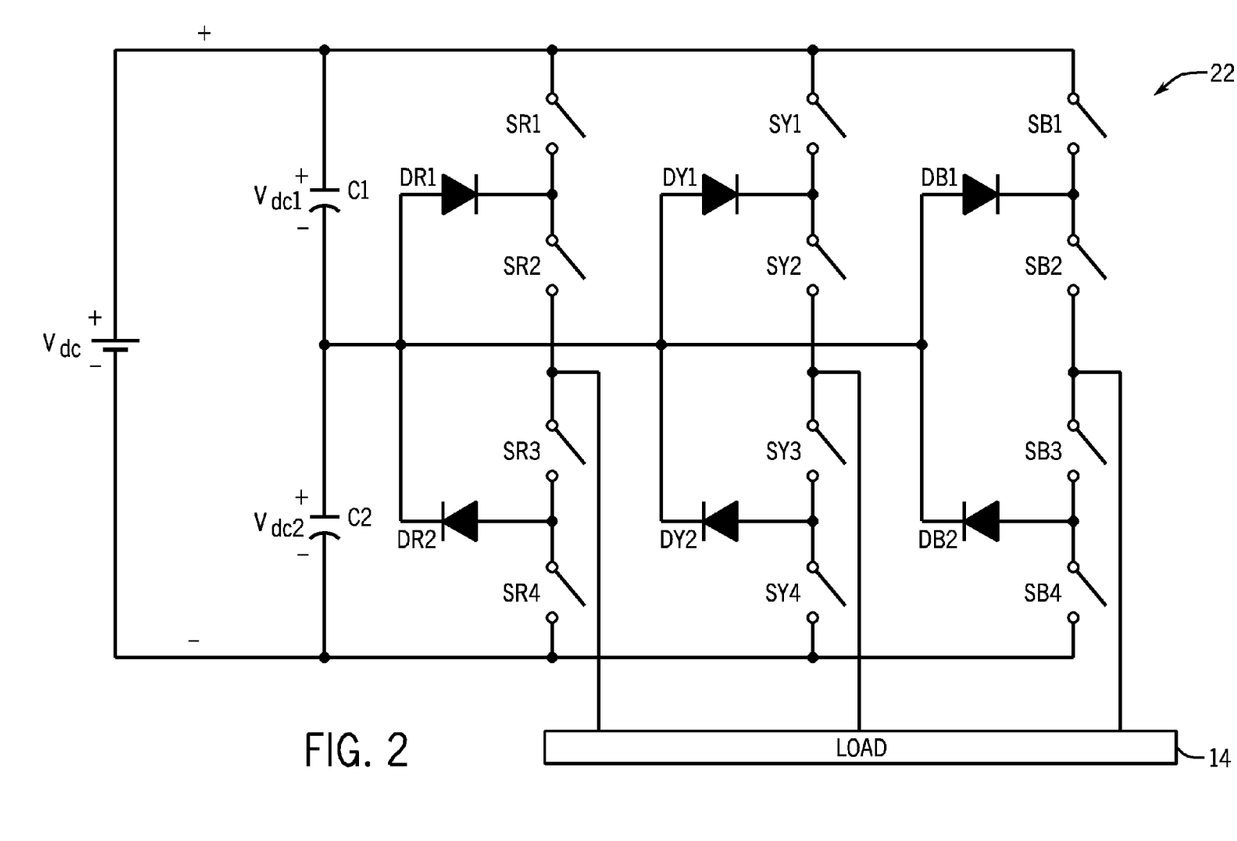
FIG. 2 is a circuit diagram of a neutral-point-clamped (NPC) inverter capable of two-level and three-level operation, in accordance with an embodiment.

The control signals 28 may control the operation of various switches of the NPC inverter 22. A circuit diagram illustrating these switches appears in FIG. 2. It should be appreciated that the circuit diagram of the NPC inverter 22 shown in FIG. 2 generally illustrates a three-wire configuration. A particular four-wire configuration will be discussed further below with reference to FIG. 17. In the example of FIG. 2, a voltage difference VDC represents the DC voltage supplied to the NPC inverter 22. Capacitors C1 and C2 may have respective capacitor voltages Vdc1 and Vdc2. Between the capacitors C1 and C2 is a neutral point that is clamped by diodes on each of the three-phases of the NPC inverter 22. The three-phases of the NPC inverter 22 are illustrated as R, Y, and B. Elsewhere, corresponding nomenclature U, V, and W may also be used. It should be appreciated that R, Y, and B, and U, V, and W simply refers to the three phases (e.g., 1, 2, and 3) of power supplied to the load 14. In FIG. 2, the NPC inverter 22 is illustrated as including circuitry for these three phases. Specifically, a first phase (e.g., R) includes clamping diodes DR1 and DR2, a second phase (e.g., Y) includes clamping diodes DY1 and DY2, and a third phase (e.g., B) includes clamping diodes DB1 and DB2. Each phase also includes four switches shown respectively as SR1, SR2, SR3, and SR4; SY1, SY2, SY3, and SY4; and SB1, SB2, SB3, and SB4.

Figure 3:
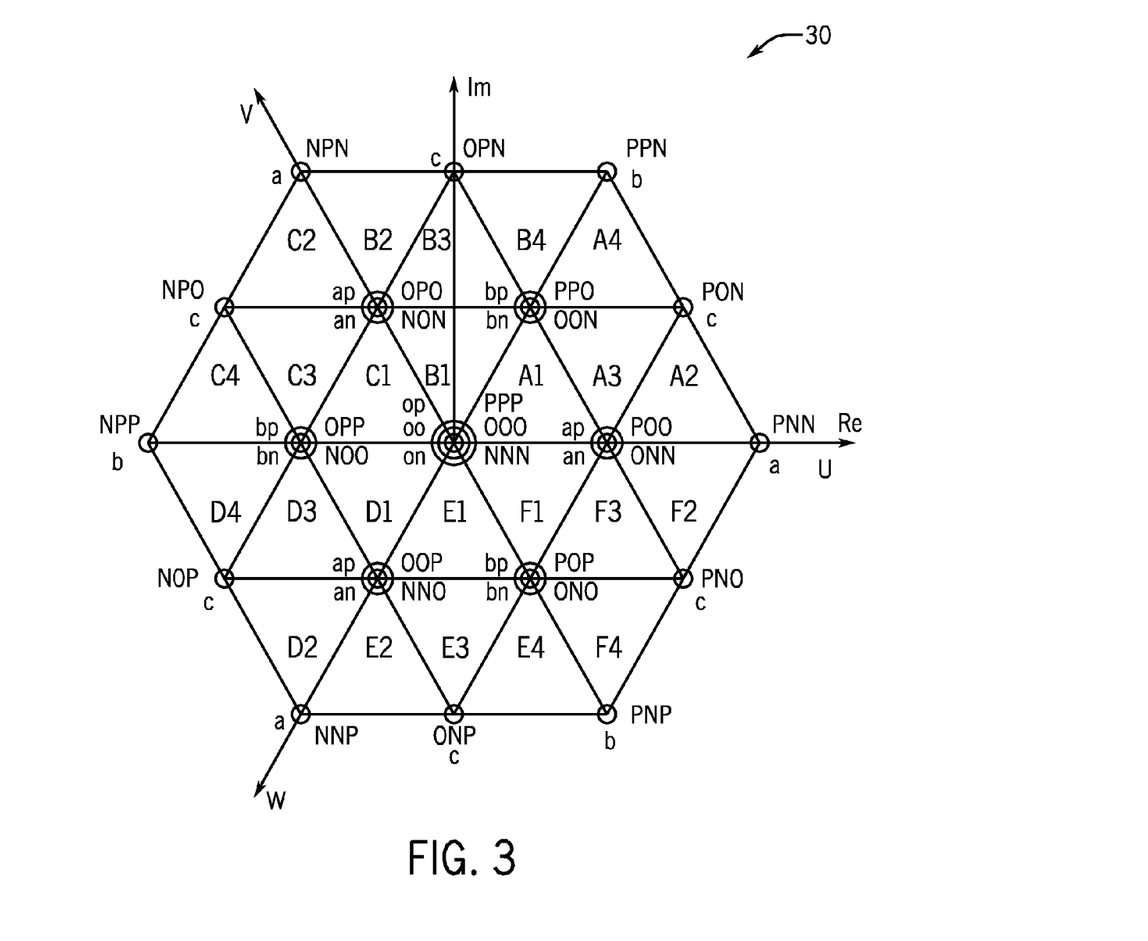
FIG. 3 is a space vector pulse width modulation (SVPWM) diagram illustrating vector switching states for three-level operation of the NPC inverter, in accordance with an embodiment.

Switching the switches SR1, SR2, SR3, SR4, SY1, SY2, SY3, SY4, SB1, SB2, SB3, and SB4 on and off in specific configurations will produce specific AC waveforms to the load 14. In one example, the controller 24 may employ a space vector pulse width modulation (SVPWM) scheme to generate the phases of power supplied to the load 14 through the NPC inverter 22. One example of a three-level SVPWM hexagon 30 appears in FIG. 3, representing the various states that can be achieved using space vector pulse width modulation. As illustrated in the SVPWM hexagon 30 of FIG. 3, an ordinate represents an imaginary component of power (Im) and an abscissa represents the real component of power (Re). The three phases of power, shown here as U, V, and W are illustrated as separated from one another by 120%. Each point in the SVPWM hexagon 30 represents a switching state of the NPC inverter 22. To provide one example, the switching state PNN, located farthest along the real axis in the SVPWM hexagon 30, may be achieved by setting the switches of the NPC inverter 22 as follows:

| SR1 | ON |
| --- | --- |
| SR2 | ON |
| SR3 | OFF |
| SR4 | OFF |
| SY1 | OFF |
| SY2 | OFF |
| SY3 | ON |
| SY4 | ON |
| SB1 | OFF |
| SB2 | OFF |
| SB3 | ON |
| SB4 | ON |

In other words, for the switching state PNN, the first phase (e.g., R) receives a voltage of approximately $$\frac{+Vdc}{2},$$

the second phase (e.g., Y) receives a voltage of approximately $$\frac{-Vdc}{2},$$

and the third phase (e.g., B) will also receive a voltage of approximately $$\frac{-Vdc}{2}.$$

In other example, the state OPN may be achieve by setting the switches of the NPC inverter 22 as follows:

| SR1 | OFF |
| --- | --- |
| SR2 | ON |
| SR3 | ON |
| SR4 | OFF |
| SY1 | ON |
| SY2 | ON |
| SY3 | OFF |
| SY4 | OFF |
| SB1 | OFF |
| SB2 | OFF |
| SB3 | ON |
| SB4 | ON |

Thus, the state OPN may be achieved by connecting the first phase to the neutral point (e.g., representing a zero vector), the second phase (e.g., Y) may receive a voltage of $$\frac{+Vdc}{2},$$

and the third phase (e.g., B) may receive a voltage of $$\frac{-Vdc}{2}.$$

The controller 24 may apply the states shown in the SVPWM hexagon 30 according to any suitable three-level mode of operation when the load 14 is substantially balanced. As can be seen in the SVPWM hexagon 30 of FIG. 3, there are four vector groups in a total of 27 SVPWM states. A first vector group represents states that offer a full vector modulation index and occur in the outer corners of the SVPWM hexagon 30. These include the states PNN, PPN, NPN, NPP, NNP, and PNP. As will be discussed in greater detail below, these six full vectors are the same vectors used in a two-level mode. When operating in the two-level mode, only these six states may be employed. In addition, as will also be discussed in greater detail below, the capacitors C1 and C2 of the NPC inverter 22 do not charge or discharge when these six states are applied.

A second vector group is a full vector divided by $\sqrt{3}$, occurring between the corners of the SVPWM hexagon 30. These states include PON, OPN, NPO, NOP, ONP, and PNO. The states in this second vector group will charge or discharge one of the capacitors C1 or C2 when applied. As will be described further below, the effect of charging and discharging the capacitors C1 and C2 of the NPC inverter 22 may be inconsequential when the load 14 is fully balanced. When the load 14 is fully balanced, the net amount of charging and discharging over all of these states will also be balanced and will not result in variations in the C1 and C2 capacitor voltages Vdc1 and Vdc2.

A third vector group represents the inner vertices of the SVPWM hexagon 30 and provide a modulation index of less than or equal to 0.5 of a full vector. As can be seen in the SVPWM hexagon 30, the inner vertices of the SVPWM hexagon 30 are redundant—that is, each vector can be achieved via two different states. The states in this third vector group include POO, ONN, PPO, OON, OPO, NON, OPP, NOO, OOP, NNO, POP, and ONO. As will be discussed in greater detail below, when these SVPWM states are applied, the capacitors C1 and C2 of the NPC inverter 22 may charge or discharge. Under normal three-level operation with a fully balanced load, capacitor charging and discharging may be of little consequence when these various redundant states are applied substantially equally (e.g., as generally carried out using a normal suitable three-level operating mode). On the other hand, the effects of moderately unbalanced loads may be mitigated by strategically selecting particular redundant states of this vector group to charge and/or discharge the capacitors C1 and C2 of the NPC inverter 22.

A fourth and final vector group represents three redundant SVPWM states that produce a so-called dead vector in the center of the SVPWM hexagon 30. These three SVPWM states include PPP, OOO, and NNN. These states do not charge or discharge the capacitors C1 and C2. Ordinarily, these states are not used to control the NPC inverter 22 in a three-level mode.

Figure 4:
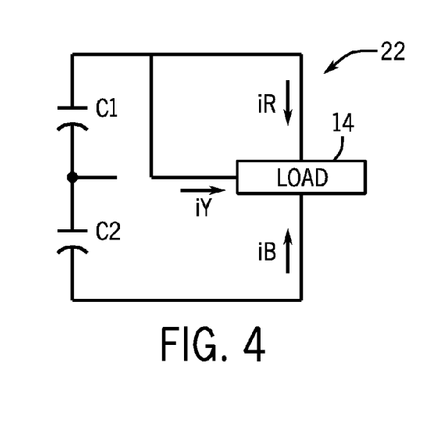
FIGS. 4 and 5 represent two-level and three-level operating states that equally discharge capacitors of the NPC inverter, in accordance with embodiments.
Figure 5:
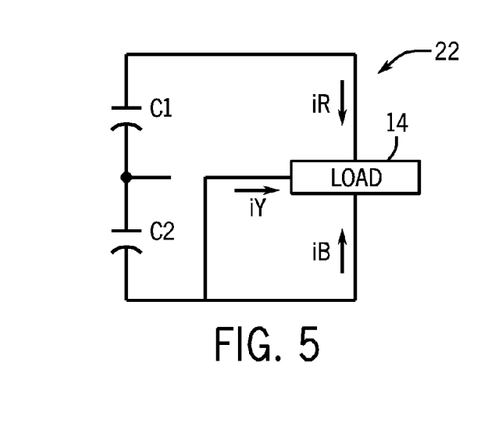

As mentioned above, the full vector states (e.g., of the first vector group) associated with the vertices of the SVPWM hexagon 30 do not disparately charge or discharge the capacitors C1 or C2. FIGS. 4 and 5, for example, represent simplified circuit diagram of the PPN and PNN states, respectively, from this vector group. Turning first to FIG. 4, when the controller 24 controls the NPC inverter 22 to operate in the PPN state, the first phase (e.g., R) and the second phase (e.g., Y) receive power via the positive rail of the DC bus connected to the capacitor C1. The third phase (e.g., B) receives power from the negative rail of the DC bus. The capacitors C1 and C2 are not unequally charged or discharged.

Likewise, as illustrated in FIG. 5, the capacitors C1 and C2 of the NPC inverter 22 are not unequally charged or discharged when the controller 24 causes the NPC inverter 22 to apply the state PNN. As seen in FIG. 5, when the controller 24 causes the NPC inverter 22 to apply the state PNN, the first phase (e.g., R) may receive power from the positive rail of the DC bus and, while the second phase (e.g., Y) and the third phase (e.g., B) receive power from the negative rail of the DC bus. As illustrated in FIG. 5, the capacitors C1 and C2 are not charged or discharged unequally.

Figure 6:
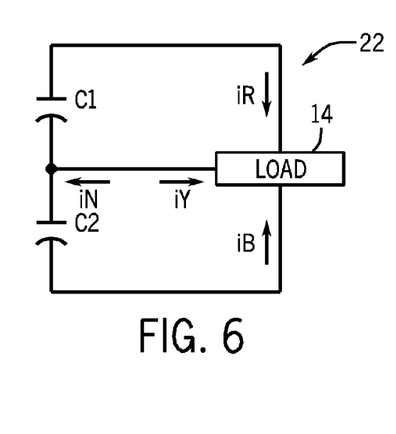
FIGS. 6-8 illustrate three-level operating states that do not necessarily equally discharge the capacitors of the NPC inverter, in accordance with embodiments.
Figure 7:
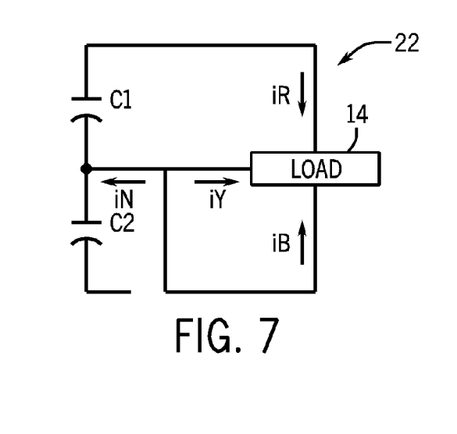
Figure 8:
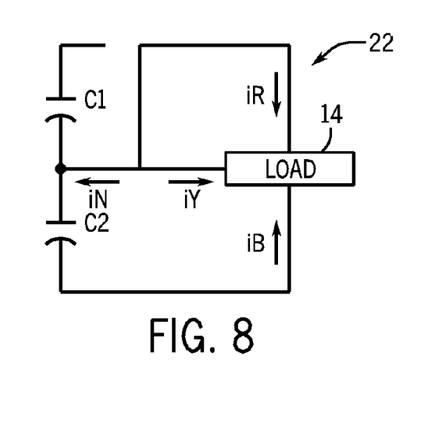

On the other hand, as illustrated in FIGS. 6-8, when certain other SVPWM states are applied to the NPC inverter 22, the capacitors C1 and C2 may unequally charge or discharge. For example, when the controller 24 applies the SVPWM state PON, the first phase (e.g., R) receives power from the positive rail of the DC bus, the third phase (e.g., B) receives power from the negative rail of the DC bus, and the second phase (e.g., Y) is connected to the neutral point, respectively producing currents iR, iB, and iY. Since the second phase (e.g., Y) is connect to the neutral point, a neutral current iN close into the node shared by C1 and C2. When the load 14 is balanced, the capacitors C1 and C2 may charge and/or discharge equally. The degree to which the load 14 is unbalanced, however, may cause the capacitors C1 and C2 to charge unequally. This unequal charging of the capacitors C1 or C2 may impact the DC bus voltage.

In the example of FIG. 7, the controller 24 has applied the state POO to the NPC inverter 22. As discussed above, the SVPWM state POO represents one of the redundant states that achieves a vector one of the inner vertices of the SVPWM hexagon 30 of FIG. 3. In the example of FIG. 7, when the SVPWM state POO is applied, the first phase (e.g., R) is connected to the positive rail of the DC bus, and the second phase (e.g., Y) and third phase (e.g., B) are connected to the neutral point. When the SVPWM state POO is applied, the capacitors C1 and C2 will necessarily be charged or discharged unequally.

This unequal charging or discharging also necessarily occurs when the SVPWM state OON is applied to the NPC inverter 22, as shown in FIG. 8. As can be seen, in the OON state, the first phase (e.g., R) and the second phase (e.g., Y) are connected to the neutral point between the capacitors C1 and C2. The third phase (e.g., B) is connected to the lower rail of the DC bus. As can be seen in FIG. 8, the capacitors C1 and C2 will necessarily charge or discharge in different amounts in the OON state.

Under normal three-level mode operation with a fully balanced load, unequal discharge of the capacitors C1 and C2 in the various states will not be problematic. Namely, normal operation of the three-level mode may involve applying the SVPWM states that charge or discharge capacitor C1 more than C2 in equal number to those states that charge or discharge capacitor C2 more than C1. Normal three-level mode operation may involve, for example, alternating between the redundant SVPWM states POO and ONN, PPO and OON, OPO and NON, OPP and NOO, OOP and NNO, and POP and ONO when the controller 24 applies vectors in the inner hexagon of the SVPWM hexagon 30.

When the load is moderately unbalanced, the controller 24 as illustrated in FIGS. 9-14 may vary the way these redundant SVPWM states are applied to mitigate the impact of the unequal loading. FIGS. 9-14 illustrate, in particular, the redundant SVPWM states and the manner in which the redundant states can be selected to account for moderately unbalanced loads. In strategically selecting one redundant state over the other to achieve a given vector while carrying out a three-level mode of operation, the controller 24 may account for relatively minor imbalances in the load 14. It may be recalled that, for purposes of this disclosure, a moderately unbalanced load may be considered "substantially balanced" because selecting the proper redundant SVPWM states may prevent unequal capacitor charging and discharging from the destabilizing the NPC inverter 22 during three-level mode operation.

Figure 9:
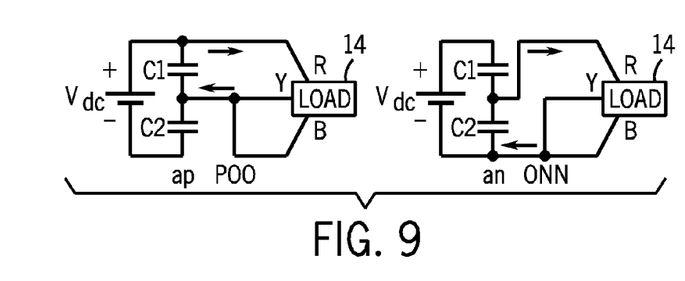
FIGS. 9-14 illustrate complementary redundant operational states that can respectively charge or discharge one capacitor in lieu of the other, in accordance with embodiments.

Considering FIG. 9, two redundant states POO and ONN are illustrated. Either of these two states may be used substantially interchangeably to obtain the same vector in the SVPWM hexagon 30. Applying one of these redundant states more than the other could cause the capacitors C1 and C2 to charge and discharge in a different manner. For example, the capacitor C1 may be charged or discharged more than the capacitor C2 in the state POO. The capacitor C2 may be charged or discharged more than the capacitor C1 in the state ONN.

Figure 10:
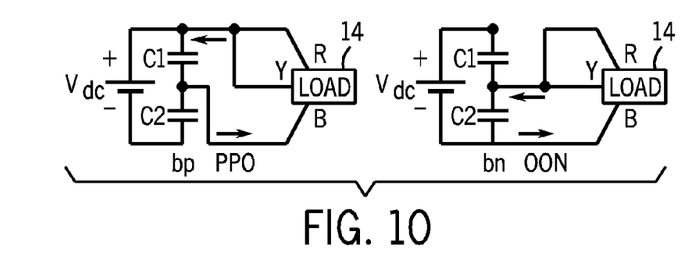
Figure 11:
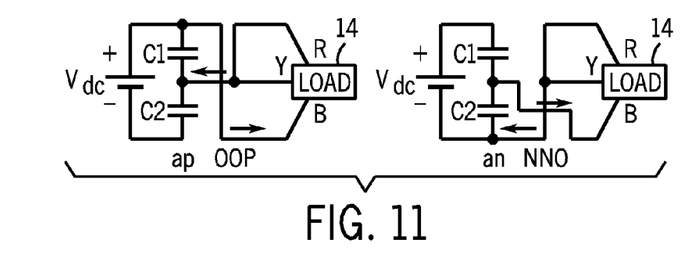
Figure 12:
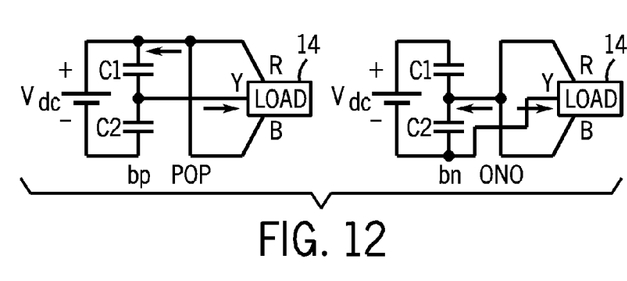
Figure 13:
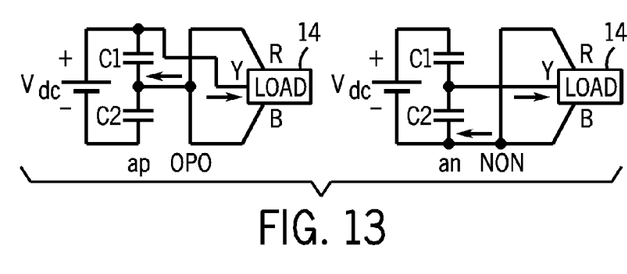
Figure 14:
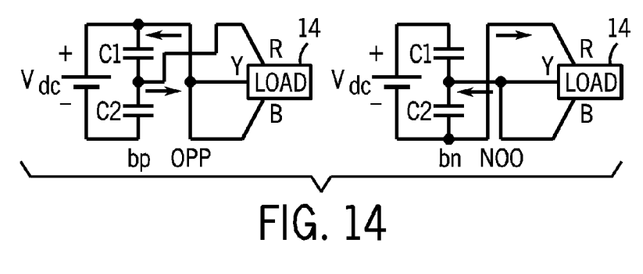

Similar effects can be seen in the other redundant states. For instance, as seen in FIG. 10, the capacitor C1 may be charged or discharged more than the capacitor C2 when the state PPO is applied. The capacitor C2 may be charged or discharged more than the capacitor C1 in the corresponding redundant state OON. In FIG. 11, it may be seen that the capacitor C1 may be charged or discharged more than the capacitor C2 when the state OOP is applied. The capacitor C2 may be charged or discharged more than the capacitor C1 in the corresponding redundant state NNO. In the state POP, as illustrated in FIG. 12, the capacitor C1 may be charged or discharged more than the capacitor C2. The capacitor C2 may be charged or discharged more than the capacitor C1 in the corresponding redundant state ONO. As seen in FIG. 13, the capacitor C1 may be charged or discharged more than the capacitor C2 when the state OPO is applied. The capacitor C2 may be charged or discharged more than the capacitor C1 in the corresponding redundant state NON. Finally, turning to FIG. 14, the capacitor C1 may be charged or discharged more than the capacitor C2 when the state OPP is applied. The capacitor C2 may be charged or discharged more than the capacitor C1 in the corresponding redundant state NOO.

Figure 15:
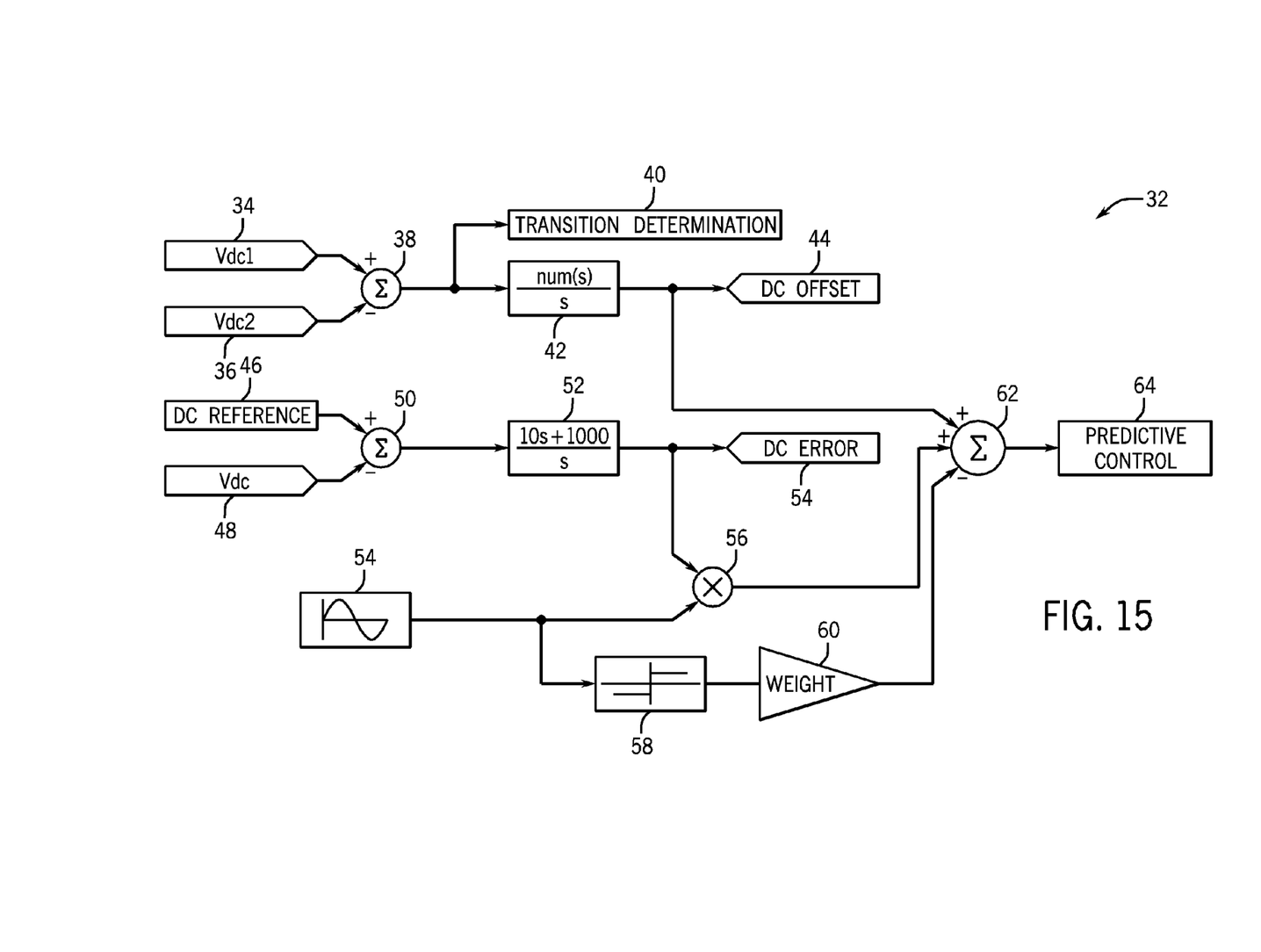
FIG. 15 is a control diagram describing a control system to control the NPC inverter despite unbalanced loading, in accordance with an embodiment.

The controller 24 may vary its selection of these redundant states depending on the extent to which the voltages across the capacitors C1 and C2 differ from one another. For example, the controller 24 may apply a control scheme 32 as shown in FIG. 15. In the example of the control scheme 32 shown in FIG. 15, the controller 24 may receive the value Vdc1 as an input 34 and the value Vdc2 as an input 36. As discussed above, the values Vdc1 and Vdc2 represent the voltages across the capacitors C1 and C2, respectively. These inputs 34 and 36 may be compared in a summation block 38. For example, the value Vdc2 may be subtracted from the value Vdc1.

The difference between the voltage difference of the first capacitor (e.g., Vdc1) and the voltage difference across the second capacitor (e.g., Vdc2) may enter a transition determination block 40. Depending on the extent to which the values Vdc1 and Vdc2 differ from one another—representing the extent to which the load 14 is unbalanced—the transition determination block 40 may cause the NPC inverter 22 to operate in a three-level mode or a two-level mode. Specifically, while the output of the summation block 38 has a magnitude of less than some threshold (e.g., when the total voltage difference of the DC bus VDC is 800 volts, approximately 10 volts), the transition determination block 40 may cause the NPC inverter 22 to operate in a three-level mode rather than a two-level mode. Under these conditions, it may be understood that the load 14 is substantially balanced. Any moderately unbalanced effects from sub-threshold voltage differences between the voltage difference of the first capacitor (e.g., Vdc1) and the voltage difference across the second capacitor (e.g., Vdc2) may be mitigated by selectively applying redundant states to charge or discharge one capacitor more than the other.

When the output of the summation block 38 has a magnitude of greater than the threshold, the transition block 40 may cause the NPC inverter 22 to operate a two-level rather than three-level mode. Specifically, as discussed above, a two-level mode may offer somewhat higher harmonic distortion, lower efficiency, and a lower power rating per converter, but may operate well when the load 14 is substantially unbalanced. As mentioned above, the two-level mode may employ only the six SVPWM states in the vertices of the SVPWM hexagon 30, which do not unequally charge or discharge the capacitors C1 and C2.

The difference between the value Vdc1 and the value Vdc2 output by the summation block 38 may also be processed through a PI controller block 42. In the control scheme 32 provided in FIG. 15, the PI controller block 42 performs the operation $$\frac{num(s)}{s}.$$

The resulting value output by the PI controller block 42 may account for minor variations in Vdc1 and Vdc2, which are generally instantaneous measurements, over time.

The output of the PI controller block 42 may be output as a DC offset output 44. This DC offset output 44 may be used by the controller 24 to compensate for moderately unbalanced loads that remain substantially balanced—that is, the differences between the values Vdc1 and Vdc2 are sufficiently low enough (e.g., beneath the threshold) to be adjusted while remaining in the three-level mode. In particular, the controller 24 may modify the three-level mode based on the redundant SVPWM states discussed above with reference to FIGS. 9-14. That is, by selectively applying the redundant states to charge or discharge a particular capacitor C1 or C2, the controller 24 may account for such moderately unbalanced loads 14 (in effect, keeping the load 14 substantially balanced).

The control scheme 32 may also involve certain predictive controls to control the rectifier 18 and the NPC inverter 22. For example, a reference value 46 (e.g., 800 volts) may be compared to the value Vdc, shown as an input 48, in a summation block 50. The DC reference 46 may represent any target reference of voltage difference on the DC bus to the NPC inverter 22. The input 48 represents the actual measured value of this voltage difference. The difference between the DC reference 46 and the value Vdc input 48, output by the summation block 50, may be processed through a PI controller block 52. The PI controller block 52 may apply any suitable transform, such as $$\frac{10s + 1000}{s}.$$

The output of the PI controller block 52 may be used as a DC error output 54.

A reference waveform 55 may be multiplied by the output of the PI controller 52. In addition, the reference waveform 55 may be processed through a zero crossing improvement block 58, which may be weighted in a weighting block 60 (e.g., weighted by 2). The DC error 54, multiplied by the reference waveform 55 in the multiplication block 56, may be added to the DC offset 44 in a summation block 62. Also in the summation block 62, the output of the weighting block 60 may be subtracted. The value output by the summation block 62 may be used in a predictive control block 64. The predictive control block 64 may determine the appropriate pulse width modulation (PWM) reference waveform to control the NPC inverter 22 and/or the rectifier 18.

Figure 16:
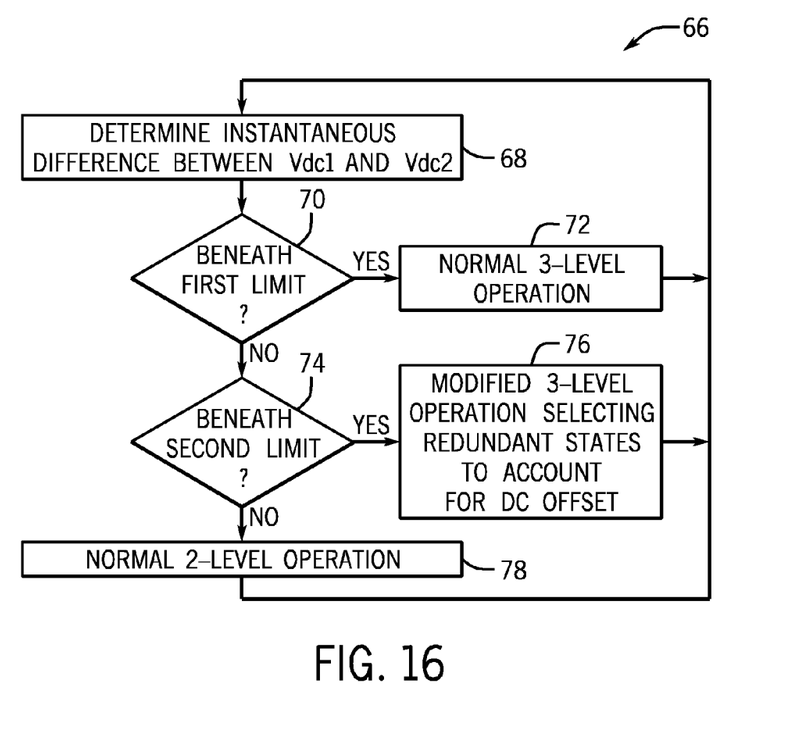
FIG. 16 is a flowchart representing a manner of controlling the NPC inverter in various ways depending on the extent to which the load is unbalanced, accordance with an embodiment.

Determining whether to operate in a two-level or three-level mode, as discussed above, may take place as generally represented by a flowchart 66 of FIG. 16. The flowchart 66 may begin when the controller 24 determines the instantaneous difference between the value Vdc1 and Vdc2 (block 68). This difference may represent the extent to which the load 14 is not completely balanced (even if the load 14 remains "substantially balanced"). While the difference between the value Vdc1 and Vdc2 remains beneath a first limit (e.g., low enough not be mitigable via modified three-level operation) (decision block 70), the controller 24 may carry out normal three-level operation of the NPC inverter 22 (block 72). The controller 24 may carry out normal three-level operation of the NPC inverter 22 in any suitable manner.

When the difference between the values Vdc1 and Vdc2 are above the first limit (decision block 70) but beneath a second limit (decision block 74), the controller 24 may carry out a modified three-level operation (block 76). Under this condition, the load 14 may be moderately unbalanced, but still may be considered "substantially balanced" because the modified three-level operation may sufficiently mitigate the unbalanced effect. Specifically, the controller 24 may select specific redundant states from the inner hexagon of the SVPWM hexagon 30 of FIG. 3. The controller 24 may select the specific redundant states to charge and/or discharge the capacitors C1 and C2 to account for this offset value (e.g., as noted with reference to the DC offset output 44 of FIG. 15).

When the difference between the values Vdc1 and Vdc2 exceeds both the first limit (decision block 70) and the second limit (decision block 74), operating in the modified three-level mode of block 76 may insufficiently account for unbalanced nature of the load 14. Under such conditions, the load 14 may be considered substantially unbalanced. The controller 24 may cause the NPC inverter 22 to operate in the two-level mode using any suitable technique. While operating in the two-level mode, the controller 24 may only apply the SVPWM states of the outer vertices of the SVPWM hexagon 30 of FIG. 3 (e.g., PNN, PPN, NPN, NPP, NNP, and PNP).

Figure 17:
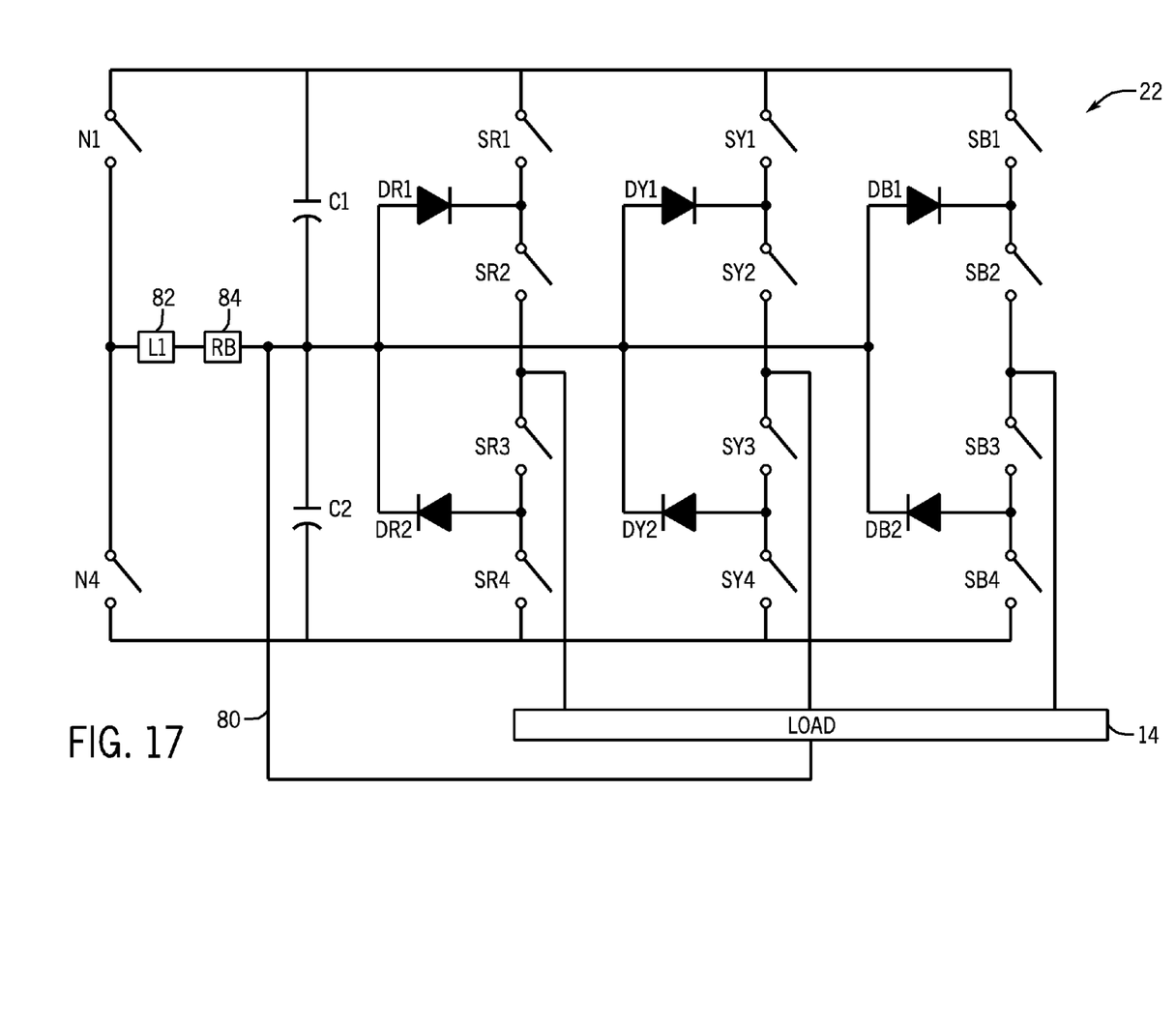
FIG. 17 is a circuit diagram of a 4-wire neutral-point-clamped (NPC) inverter, in accordance with an embodiment.

The discussion above may also apply to a 4-wire configuration of the NPC inverter 22, such as the circuit diagram of a 4-wire NPC inverter 22 generally shown in FIG. 17. In the example of FIG. 17, the NPC inverter 22 supplies three phases (e.g., R, Y, and B) of output power to the load 14. A neutral line 80 from the neutral point of the NPC inverter 22 is also connected to the load 14. An inductor 82 and a reverse blocking IGBT 84 (and/or static switch module (SSM)) may connect the neutral point of the NPC inverter 22 to a fourth leg of the NPC inverter that includes switches N1 and N4. In some embodiments, additional switches N2 and N3 between the switches N1 and N4 may be present, but may remain closed. As such, switches N2 and N3 are not shown in FIG. 17.

The 4-wire configuration of the NPC inverter 22 of FIG. 17 may operate in a similar manner to the 3-wire configuration of the NPC inverter 22 of FIG. 2. That is, while the load 14 remains substantially balanced, the NPC inverter 22 may operate in a three-level mode and the reverse blocking IGBT 84 may be open. The switches N1 and N4 may also remain open under these conditions. If the load 14 becomes unbalanced beyond some threshold amount, the reverse blocking IGBT 84 and/or SSM may close, joining the fourth leg of the NPC inverter 22 to the neutral point in the neutral line 80.

Thereafter, the controller 24 may switch the switches N1 and N4 in any suitable manner to regulate the neutral current on the neutral line 80, while also improving the utilization of the DC bus voltage.

Figure 18:
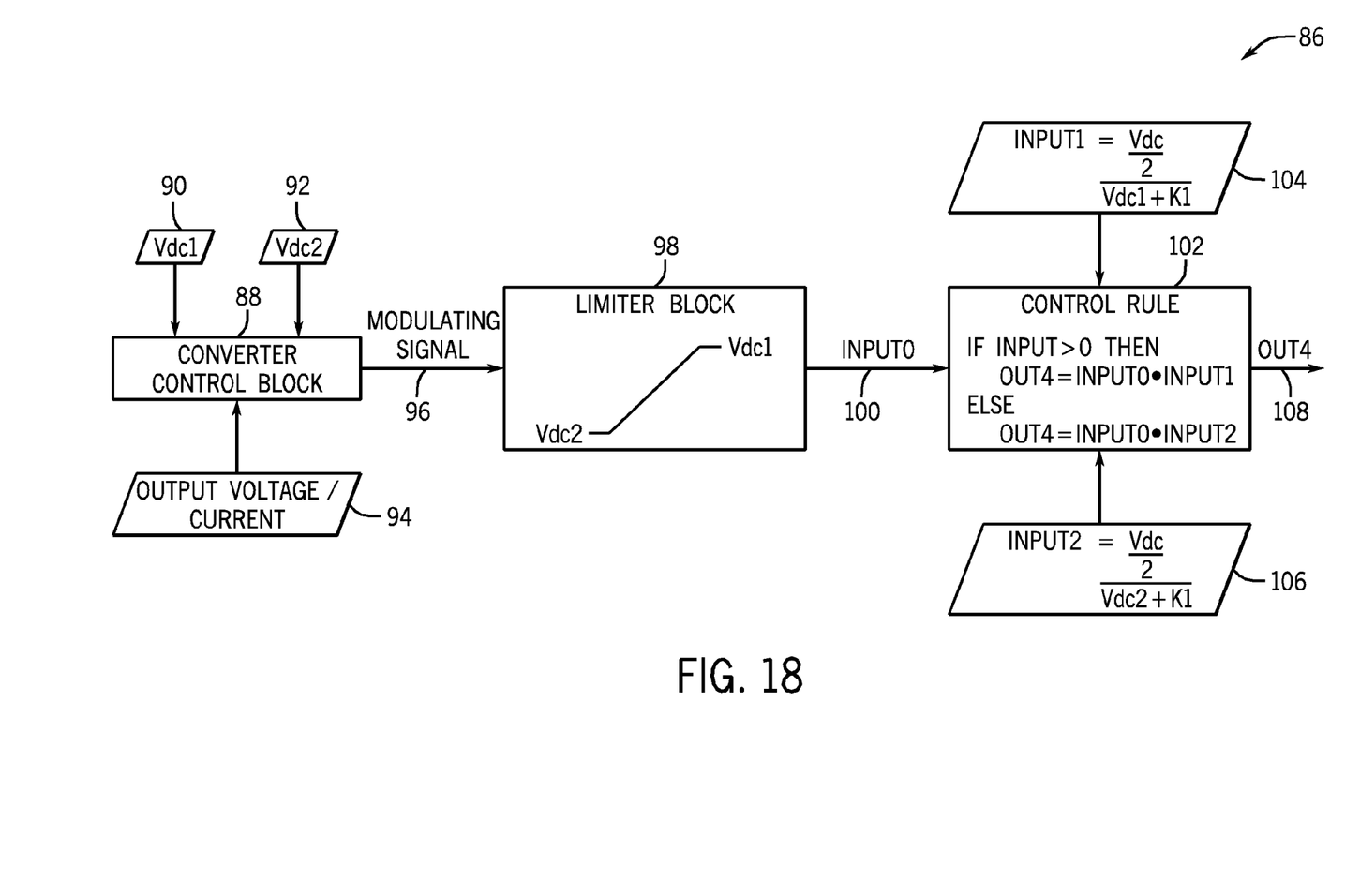
FIG. 18 is a control diagram representing a manner of controlling the NPC inverter of FIG. 17 despite unbalanced loading, in accordance with an embodiment.

With the 4-wire configuration of the NPC inverter 22 shown in FIG. 17, the controller 24 may employ a control scheme 86, as shown in FIG. 18. In the control scheme 86 of FIG. 18, a converter control block 88 may receive the values Vdc1 (numeral 90) and Vdc2 (numeral 92), as well as output voltage and current values from the NPC inverter 22 (numeral 94). The converter control block 88 may employ any suitable control technique, including those described above, to obtain a modulating signal 96. A limiter block 98 may limit the modulating signal to between the values Vdc1 and Vdc2 to produce a signal 100, here labeled Input0. A control rule block 102 may receive the Input0 signal 100 and two other input values 104 and 106. The input value 104, shown as Input1, may be determined according to the relationship $$Input1 = \frac{\frac{Vdc}{2}}{Vdc1 + K1},$$

where Vdc is a constant value (e.g., 800V). Similarly, the input value 106, shown as Input 2, may be determined according to the relationship $$Input2 = \frac{\frac{Vdc}{2}}{Vdc2 + K1}.$$

The control rule block 102 then may apply the control rule shown. That is, when the input0 signal 100 is greater than 0, an output signal 108, shown as OUT4, to be determined according to the relationship OUT4=Input0·Input1. Similarly, when the input0 signal 100 is not greater than 0, the output signal 108 OUT4 may be equal to the relationship OUT4=−Input0·Input2. The output signal 108 OUT4 represents a modulating signal that can be compared to a triangular waveform to mitigate a ground current in the 4-wire of the NPC inverter 22 of FIG. 17. It should be appreciated that the control rule block may be employed for all 4 legs of the NPC inverter 22 of FIG. 17 and all 3 legs of the rectifier 18 to mitigate the ground current when neutral is grounded.

Figure 19:
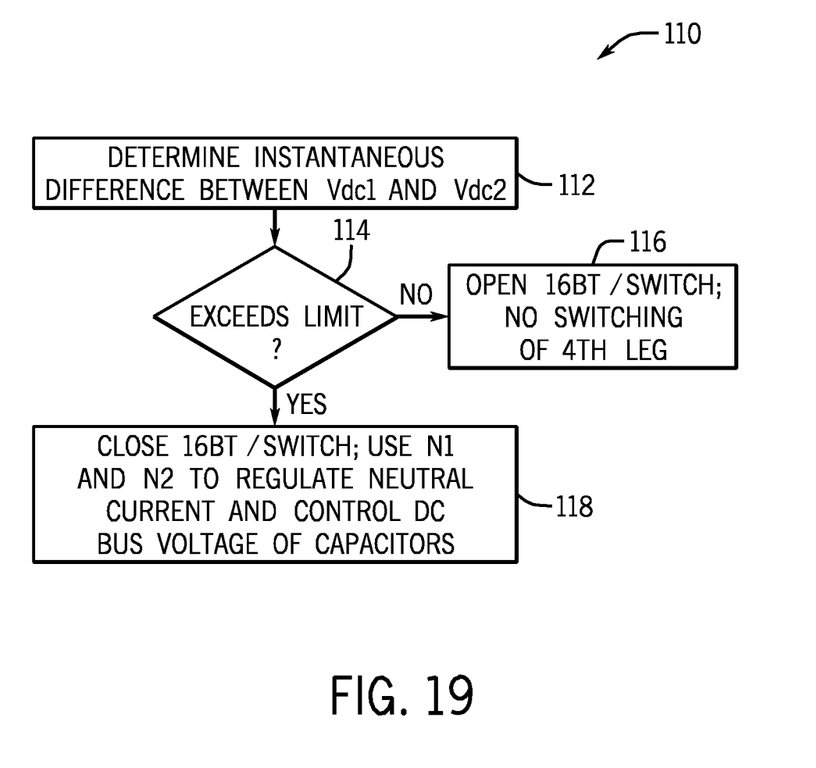
FIG. 19 is a flowchart of a method for operating the NPC inverter of FIG. 17 based on the extent to which the load is unbalanced, in accordance with an embodiment.

As mentioned above, the 4-wire configuration of the NPC inverter 22 shown in FIG. 17 may be operated in different ways depending on rather the load 14 is substantially balanced or substantially unbalanced. A flowchart 110 of FIG. 19 represents one such manner of controlling the NPC inverter 22 of FIG. 17. The flowchart 110 may begin when the controller 24 determines the instantaneous difference between the values Vdc1 and Vdc2 (block 112). When this difference value is within some limit (e.g., within approximately 0.5%, 0.6%, 0.7%, 0.8%, 0.9%, 1.0%, or 1.1% of an ideal value) (decision block 114), the controller 24 may cause the reverse blocking IGBT 84 and/or SSM to be open. Consequently, the controller 24 may not switch the fourth leg of the NPC inverter 22. On the other hand, when the difference between the values Vdc1 and Vdc2 do exceed the limit (decision block 114), the controller 24 may close the reverse blocking IGBT 84 and/or SSM (block 118). Thereafter, the controller 24 may switch the switches N1 and N2 to regulate the neutral current flowing through the neutral line 80 and to control the DC bus voltage on the capacitors C1 and C2.

Technical effects of the present disclosure include, among other things, intelligent transitions between two-level and three-level operation of a neutral-point-clamped (NPC) inverter depending on the balance of the load. Thus, when the load is substantially balanced, an uninterruptable power supply (UPS) that uses an NPC inverter may apply a three-level operating mode. Three-level operation may provide a higher power rating, a higher efficiency, and a lower harmonic distortion as compared to a two-level mode. Moreover, a UPS according to the present disclosure may continue to operate in a three-level mode while the load remains substantially balanced, even if some unbalancing of the load occurs, by manipulating the redundant switching vectors when applying vector control over the NPC inverter. Finally, by operating in a two-level mode when the load becomes substantially unbalanced, the UPS may be able to continue to operate despite changes in the balance of the load.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An uninterruptible power supply (UPS) system comprising:
  a neutral-point-clamped inverter to supply power to a load; and
  a controller configured to control the inverter to operate in a three-level mode of operation or higher when the power to the load is substantially balanced and to operate in a two-level mode of operation when the power to the load is substantially unbalanced, wherein the controller is configured to determine when the load is substantially balanced and substantially unbalanced based at least in part on a difference between voltage differences of capacitors, wherein the controller is configured to control the inverter to operate in a normal three-level mode when the difference between the voltage differences of the capacitors exceeds a first threshold and to operate in a modified three-level mode when the difference between the voltage differences of the capacitors exceeds the first threshold but not a second threshold.

2. The system of claim 1, wherein the inverter is configured to connect to the load via a three-wire configuration.

3. The system of claim 1, wherein the inverter is configured to connect to the load via a four-wire configuration.

4. The system of claim 3, wherein the inverter comprises four legs, a first, second, and third of which provide power to the load and a fourth of which regulates a neutral current from the load when the load is substantially unbalanced.

5. The system of claim 4, wherein the controller is configured to control the fourth leg to reduce the difference between the voltage differences of the capacitors disposed on opposite sides of a neutral point in the inverter.

6. The system of claim 4, wherein the inverter comprises a reverse blocking IGBT or a static switch module, or both, between the fourth leg and a neutral point coupled to the first, second, and third legs and the controller is configured to control the reverse blocking IGBT or the static switch module, or both, to be open when the load is substantially balanced and to be closed when the load is substantially unbalanced.

7. The system of claim 1, wherein the inverter comprises three legs and each of the three legs comprises four switches, wherein the controller is configured to variously switch the four switches of each leg on or off while the inverter is operating in the three-level mode and to variously switch only two of the four switches of each leg on and off while the remaining two of the four switches of each leg are maintained on while the inverter is operating in the two-level mode.

8. An uninterruptible power supply (UPS) system comprising:
a neutral-point-clamped inverter to supply power to a load; and
a controller configured to control the inverter to operate in a three-level mode or higher when the load is substantially balanced and to operate in a two-level mode when the load is substantially unbalanced, wherein the inverter comprises at least two capacitors disposed on opposite sides of a neutral point and the controller is configured to determine when the load is substantially balanced and substantially unbalanced based at least in part on a difference between voltage differences of the capacitors, wherein the controller is configured to control the inverter to operate in a normal three-level mode when the difference between the voltage differences of the capacitors exceeds a first threshold and to operate in a modified three-level mode when the difference between the voltage differences of the capacitors exceeds the first threshold but not a second threshold, and wherein the load is substantially unbalanced when the difference between voltage differences of the capacitors exceeds the second threshold.

9. The system of claim 8, wherein the controller is configured to control the inverter to operate in a modified three-level mode when the difference between the voltage differences of the capacitors exceeds some threshold but the load otherwise remains substantially balanced, wherein the inverter is configured to control the inverter to operate in the modified three-level mode by selecting redundant space vector pulse width modulation states that charge or discharge the capacitors so as to reduce the difference between the voltage differences of the capacitors.

10. The system of claim 1, wherein the controller is configured to determine that the load is substantially unbalanced when a difference between voltage differences of capacitors disposed on opposite sides of a neutral point in the inverter cannot be reduced by selecting redundant space vector pulse width modulation states that charge or discharge the capacitors so as to reduce the difference between the voltage differences of the capacitors.

11. The system of claim 1, wherein the controller is configured to cause the inverter to operate in the two-level mode according to space vector pulse width modulation using only states defined as outer corner points of a space vector pulse width modulation hexagon.

12. An article of manufacture comprising:
one or more tangible, non-transitory machine-readable media at least collectively comprising machine-executable instructions, the instructions comprising:
instructions to receive a value of a first voltage difference associated with a first capacitor in a neutral-point-clamped inverter;
instructions to receive a value of a second voltage difference associated with a second capacitor in the neutral-point-clamped inverter;
instructions to determine a value of a difference between the first voltage difference and the second voltage difference;
instructions to determine, when the difference between the first voltage difference and the second voltage difference does not exceed a first threshold but not a second threshold, to operate the neutral-point-clamped inverter according to a three-level mode or higher; and
instructions to determine, when the difference between the first voltage difference and the second voltage difference exceeds the first threshold, to operate the neutral-point-clamped inverter according to a two-level mode.

13. The article of manufacture of claim 12, wherein the instructions comprise:
instructions to pass the difference between the first voltage difference and the second voltage difference through a P I controller to obtain a DC offset value; and
instructions to modify the three-level mode so as to reduce the DC offset value.

14. The article of manufacture of claim 13, wherein the instructions to modify the three-level mode comprise instructions to select from among redundant space vector pulse width modulation states so as to reduce the DC offset value.

15. The article of manufacture of claim 13, wherein the instructions to modify the three-level mode comprise instructions to select between space vector pulse width modulation states POO and ONN, PPO and OON, OOP and NNO, POP and ONO, OPO and NON, and OPP and NOO so as to reduce the DC offset value.

16. The article of manufacture of claim 12, wherein the instructions comprise instructions to determine, when the difference between the first voltage difference and the second voltage difference exceeds the first threshold, to operate a fourth leg of the neutral-point-clamped inverter to regulate a neutral current and increase utilization of a direct current (DC) bus supplying power to the neutral-point-clamped inverter.

17. The article of manufacture of claim 12, wherein the instructions comprise instructions to control a reverse blocking IGBT or a static switch module, or both, to be open when the difference between the first voltage difference and the second voltage difference does not exceed the first threshold and to be closed when the difference between the first voltage difference and the second voltage difference exceeds the first threshold, wherein the reverse blocking IGBT or the static switch module, or both, are disposed between a fourth leg and a neutral point coupled to the first, second, and third legs of the neutral-point-clamped inverter.

18. The system of claim 1, wherein the load is substantially unbalanced when the difference between voltage differences of the capacitors exceeds the second threshold.

19. The system of claim 1, wherein the inverter comprises at least two capacitors disposed on opposite sides of a neutral point of the inverter.

* * * * *